Patented Jan. 11, 1949

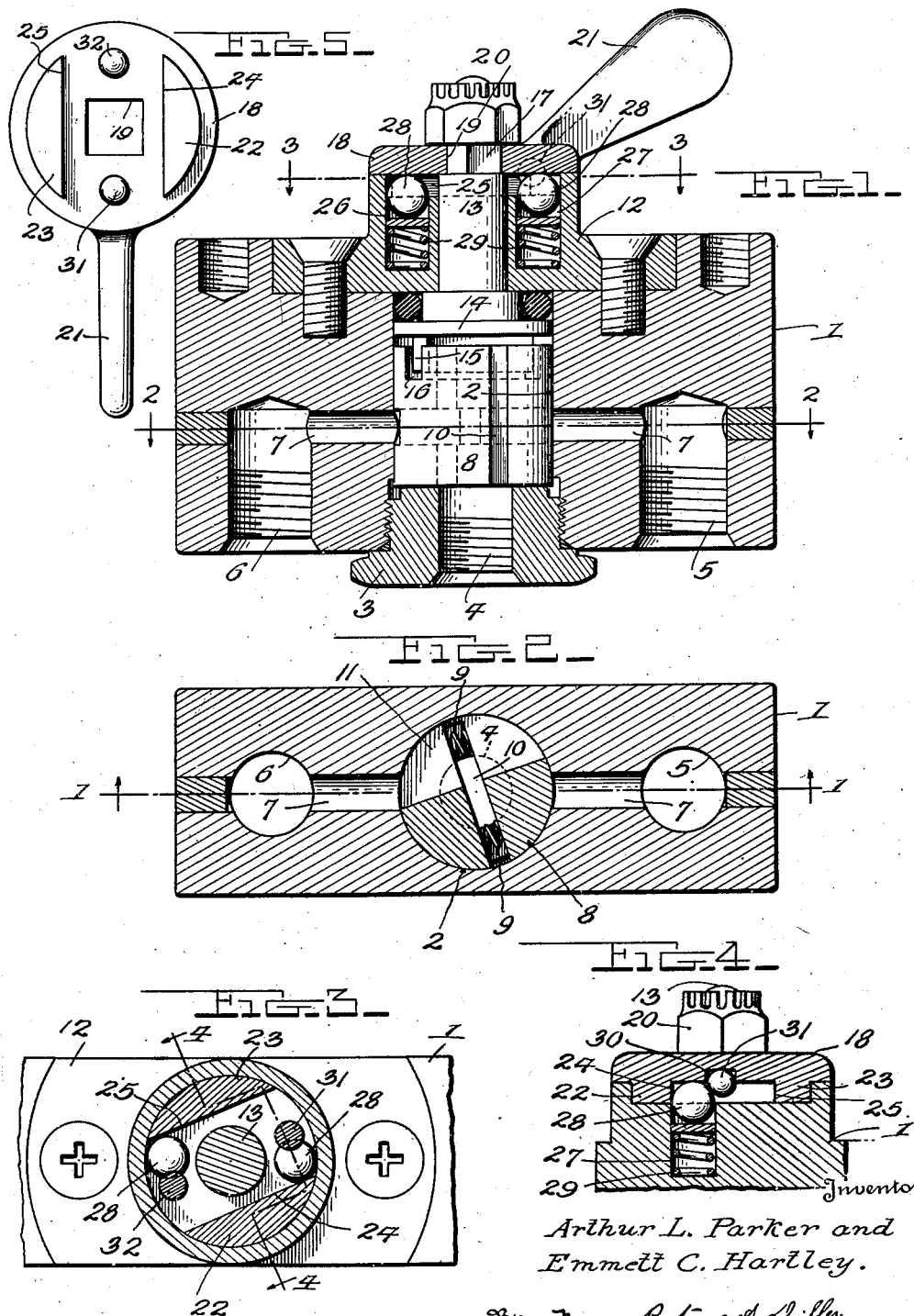

2,458,873

UNITED STATES PATENT OFFICE 2,458,873

INDEXING MECHANISM FOR VALVES

Arthur L. Parker and Emmett C. Hartley, Cleveland, Ohio, assignors to The Parker Appliance Company, Cleveland, Ohio, a corporation of Ohio Application May 29, 1944, Serial No. 537,935

3 Claims. (Cl. 251—163)

The invention relates to new and useful improvements in an indexing mechanism for valves and more particularly to a valve which is adapted to be moved selectively to one of two set positions.

An object of the invention is to provide an indexing mechanism for positively controlling the set positions of the rotary valve wherein the cooperating elements of the indexing mechanism are symmetrically disposed relative to the stem of the rotor.

A further object of the invention is to provide an indexing mechanism of the above type wherein spaced shoulders movable with the rotor contact yielding members carried by the valve casing.

A still further object of the invention is to provide an indexing mechanism of the above type wherein means is provided for holding the yielding members in contact with the shoulders.

These and other objects will in part be obvious and will in part hereinafter be more fully disclosed.

In the drawings:

Figure 1 is a longitudinal sectional view through the valve casing on the line 1—1 of Figure 2;

Figure 2 is a sectional view on the line 2—2 of Figure 1;

Figure 3 is a sectional view on the line 3—3 of Figure 1;

Figure 4 is a sectional view on the line 4—4 of Figure 3; and

Figure 5 is a bottom plan view of the control disk of the indexing mechanism which carries the handle for turning the rotor.

The invention has to do with an indexing mechanism for a valve having a rotor. As illustrated, the valve includes a valve casing 1 which is preferably in the form of a solid block. Extending centrally from top to bottom of the valve casing is an opening forming a valve chamber 2. The opening at the bottom is closed by an adapter 3 having a port 4 extending therethrough, which is adapted to be connected to a pipe leading to a place of use. The valve casing is also provided with ports 5 and 6 which extend into the valve casing and are substantially parallel with the port 4. These ports 5 and 6 are adapted to be connected with independent sources of supply or sources for creating a vacuum. Extending transversely of the valve casing is a port 7 which leads to the valve chamber.

Disposed in the valve chamber is a valve rotor 8 which is made from two segments of a cylinder, the outer curved faces of which conform to the cylindrical wall of the valve chamber 2. These segments are pressed against the valve chamber by means of springs 9, 9. The two segments are spaced from each other and this provides a port 10 leading lengthwise of the rotor which is continuously connected with the port 4. Each segment of the rotor has a transverse port 11 which is adapted to selectively connect the ports 5 and 6 with the port 7. This valve structure is shown, described and claimed in a companion application, Serial No. 537,936, filed on even date herewith, now Patent No. 2,391,505, issued Dec. 25, 1945 and further detailed description of the valve mechanism is not thought necessary.

The cylindrical chamber 2 is closed at its upper end by a cap 12 through which a valve operating stem 13 extends. This valve operating stem carries a head 14 at its lower end which has a transverse rib 15 engaging the groove 16 in the rotor for turning the same. The cap 12 has a raised hub and the valve stem 13 projects above the hub. The immediate portion of the valve stem projecting above the hub is made rectangular in cross section, as indicated at 17.

A disk 18 has an opening 19 therethrough which is shaped to conform to this extension 17. The disk is secured to the stem 13 by a nut 20. The disk 18 is provided with an integrally formed handle 21 as illustrated in the drawings. On the under face of the disk 18 are two downwardly projecting portions 22 and 23. The portion 22 is provided with a right angular shoulder 24 and the portion 23 is provided with a right angular shoulder 25. These are stop shoulders and they are spaced from each other.

The cap 12 is provided at diametrically opposite points with recesses 26 and 27. Located in each recess is a ball 28. Also located in each recess is a spring 29. The springs 29 press the balls 28 outwardly into contact with the under face of the disk 18. When the rotor is in the position shown in Figure 2, the port 6 is connected to the port 4 and the connection to the port 5 is closed. When the rotor is in this position just stated, the shoulder 25 is moved so as to contact with the ball 28 disposed in the recess 26. At this time the shoulder 24 is also contacted with the ball 28 associated with the recess 27. The rotor cannot be turned further as these shoulders contacting with the balls positively limits the turning movement of the rotor.

The disk 18 is provided on its under face with two recesses, one of which is indicated at 30. In this recess 30 is placed a ball 31. Diametrically opposed to the recess 30 is a second recess in which is placed a ball 32. These balls 31 and 32 are disposed in a line parallel with the shoulders 24 and 25 and midway between the same. Inasmuch as the balls 28 are yieldingly mounted, these projections formed by the balls 30, 31 can readily pass over the balls 28 and they are so positioned that when the shoulders contact with the balls 28 they will be held firmly in this position. This not only ensures that the selected port will be fully open, but it will be maintained in its fully open position.

It is obvious that many changes in the details of construction may be made without departing from the spirit of the invention as set forth in the appended claims.

We claim:

1. An indexing mechanism for a valve comprising a casing, a valve chamber provided with ports in the wall thereof, a valve rotor disposed in said chamber and having a port adapted to be selectively connected to the ports in the valve chamber, a stem connected to said valve rotor and projecting from said casing, a disk secured to said stem, spaced parallel stop shoulders carried by said disk, yieldable members carried by said valve casing and adapted to be selectively engaged by the respective stop shoulders, and means carried by said disk and cooperating with said yieldable members for holding said stop shoulders in contact with said yieldable members.

2. An indexing mechanism for a valve comprising a casing, a valve chamber provided with ports in the wall thereof, a valve rotor disposed in said chamber and having a port adapted to be selectively connected to the ports in the valve chamber, a stem connected to said valve rotor and projecting from said casing, a disk secured to said stem, spaced parallel stop shoulders carried by said disk, said stop shoulders being substantially at right angles to the plane of the disk, diametrically opposed rounded projecting members carried by said disk and located midway between said shoulders, and yieldable members carried by said valve casing and adapted to be selectively engaged by the respective stop shoulders, said projecting members operating to hold the yieldable members in contact with the stop shoulders.

3. An indexing mechanism for valves comprising a casing, a valve chamber provided with ports in the wall thereof, a valve rotor disposed in said chamber and having a port adapted to be selectively connected to the ports in the valve chamber, a stem connected to said valve rotor and projecting from said casing, a disk secured to said stem, spaced parallel stop shoulders carried by the under face of said disk, rounded projecting members carried by said disk and spaced from said stop shoulders, said casing beneath the disk having recesses formed therein, balls mounted in said recesses, a spring associated with each ball for yieldingly pressing the same against the disk, said balls being dimensioned so as to engage between a selected shoulder and the projection on the disk associated therewith for yieldingly holding said disk in the selected position.

ARTHUR L. PARKER.
EMMETT C. HARTLEY.

REFERENCES CITED

The following references are of record in the file of this patent:

UNITED STATES PATENTS

| Number | Name | Date |
|---|---|---|
| 947,463 | Sundberg | Jan. 25, 1910 |
| 1,578,383 | Bayles | Mar. 30, 1926 |